United States Patent
Votaw et al.

(10) Patent No.: US 8,951,103 B2
(45) Date of Patent: Feb. 10, 2015

(54) FOLDABLE, BOOT LOADABLE, INSERTABLE AIR DAMPER DEVICE

(75) Inventors: Mark Votaw, North Canton, OH (US);
Dennis Laughlin, Chardon, OH (US);
Al Zelczer, University Heights, OH (US); Howard Zelczer, Brooklyn, NY (US); Lenny Roth, University Heights, OH (US); Vladimir Sipershteyn, Independence, OH (US); Joseph Ramunni, Wadsworth, OH (US); Bill Molica, Willowick, OH (US)

(73) Assignee: Arzel Zoning Technology, Inc., Cleveland, OH (US)

( * ) Notice: Subject to any disclaimer, the term of this patent is extended or adjusted under 35 U.S.C. 154(b) by 861 days.

(21) Appl. No.: 12/913,261

(22) Filed: Oct. 27, 2010

(65) Prior Publication Data
US 2012/0108159 A1    May 3, 2012

(51) Int. Cl.
*F24F 13/10*    (2006.01)
*F24F 13/14*    (2006.01)

(52) U.S. Cl.
CPC ......... *F24F 13/1413* (2013.01); *F24F 13/1426* (2013.01); *F24F 2013/1466* (2013.01); *F24F 2221/36* (2013.01)
USPC ............ 454/333; 454/239; 454/266; 454/334

(58) Field of Classification Search
CPC ... F24F 13/10; F24F 13/1413; F24F 13/1426; F24F 2013/1466; F24F 2221/36
USPC .......................... 454/254, 333, 334, 239, 266
See application file for complete search history.

(56) References Cited

U.S. PATENT DOCUMENTS

| | | | | |
|---|---|---|---|---|
| 95,938 | A | * | 10/1869 | Safford ........................ 454/333 |
| 2,315,775 | A | | 4/1943 | D'Arcey |
| 2,608,203 | A | | 8/1952 | Butler |
| 2,676,604 | A | | 4/1954 | Senna |
| 2,733,889 | A | * | 2/1956 | Mattingly ....................... 251/95 |
| 2,844,086 | A | * | 7/1958 | Birdsall ........................ 454/266 |

(Continued)

FOREIGN PATENT DOCUMENTS

WO    WO 2008019519 A1 *    2/2008    ............. F24F 13/14

OTHER PUBLICATIONS

Aprilaire Specification Sheet, Model 6706-6 Retrofit Zoned Comfort Damper, Model 8028—Damper Power Distribution Panel, 2005, 2 pages, RP Research Products Corporation, Madison, WI.

(Continued)

*Primary Examiner* — Kang Hu
*Assistant Examiner* — Anthony Kandare
(74) *Attorney, Agent, or Firm* — Hahn Loeser & Parks, LLP

(57) ABSTRACT

A foldably tensioned boot loadable air damper device for controlling the flow of air through ductwork, and a method of installing same. The damper device includes an actuator having a retractable member and a pivoting member, wherein the pivoting member is operatively connected to the retractable member of the actuator. The damper device also includes at least one support base supporting the actuator and the pivoting member with respect to each other, a foldable damper blade attached to the pivoting member, and at least one tensioned hinge member operatively connected to the foldable damper blade for unfolding the damper blade. The damper device may be inserted through a register boot and into a ductwork when folded.

24 Claims, 10 Drawing Sheets

(56) References Cited

U.S. PATENT DOCUMENTS

| | | | |
|---|---|---|---|
| 2,902,254 A | | 9/1959 | Conway et al. |
| 3,420,448 A | * | 1/1969 | Snow .................... 239/569 |
| 3,512,752 A | | 5/1970 | Uerlichs et al. |
| 3,580,238 A | | 5/1971 | Diehl |
| 3,771,759 A | | 11/1973 | Pauquette |
| 3,791,279 A | * | 2/1974 | Holt et al. .................... 250/384 |
| 3,799,434 A | | 3/1974 | Heidacker |
| 4,147,298 A | | 4/1979 | Leemhuis |
| 4,189,092 A | | 2/1980 | Maxson et al. |
| 4,213,477 A | | 7/1980 | Velasquez |
| 4,241,897 A | | 12/1980 | Maezawa |
| 4,270,559 A | | 6/1981 | Wallberg |
| 4,301,831 A | | 11/1981 | Lord |
| 4,418,719 A | * | 12/1983 | Downs et al. ............ 137/625.31 |
| 4,458,487 A | | 7/1984 | Kojima et al. |
| 4,545,524 A | | 10/1985 | Zelczer |
| 4,582,249 A | | 4/1986 | Nelson |
| 4,628,954 A | * | 12/1986 | Dayus .............................. 137/75 |
| 4,691,689 A | * | 9/1987 | Shepherd et al. ............. 126/295 |
| 4,702,412 A | | 10/1987 | Zelczer et al. |
| 4,815,362 A | * | 3/1989 | Ishizuka et al. ................ 454/333 |
| 4,949,625 A | * | 8/1990 | Miklos ........................... 454/333 |
| 5,106,052 A | * | 4/1992 | Datta et al. ....................... 251/56 |
| 5,169,121 A | | 12/1992 | Blanco et al. |
| 5,363,025 A | | 11/1994 | Colling |
| 5,458,148 A | | 10/1995 | Zelczer et al. |
| 5,531,248 A | * | 7/1996 | Pearson et al. ........... 137/625.46 |
| 5,921,277 A | * | 7/1999 | Bernal ....................... 137/556.3 |
| 5,934,994 A | * | 8/1999 | Wylie et al. .................... 454/333 |
| 6,105,927 A | * | 8/2000 | Zelczer et al. .................. 251/58 |
| 6,817,378 B2 | * | 11/2004 | Zelczer .................... 137/601.09 |
| 7,410,416 B2 | * | 8/2008 | Fettkether ..................... 454/265 |
| 7,543,759 B2 | * | 6/2009 | George ........................ 236/49.3 |
| 7,566,264 B2 | * | 7/2009 | Votaw et al. ................... 454/333 |
| 7,596,962 B2 | * | 10/2009 | Karamanos ..................... 62/298 |
| 8,528,183 B2 | * | 9/2013 | Michaud et al. ................ 29/451 |
| 2008/0116288 A1 | * | 5/2008 | Takach et al. ................. 236/49.5 |
| 2009/0181611 A1 | * | 7/2009 | Hollender et al. ............ 454/333 |
| 2010/0105312 A1 | * | 4/2010 | Bamberger .................. 454/266 |
| 2011/0105012 A1 | * | 5/2011 | Niederhauser et al. ....... 454/239 |

OTHER PUBLICATIONS

Freshex Fresh Air Vetilation, Make-Up Air Controls, 2003, 1 page, Trolex Corporation.

The Zone Control Experts, Introducing the Retro Damper, Feb. 21, 2005, 2 pages, Jackson Systems, LLC, Indianapolis, IN.

The Zone Control Experts, Zone Control Products, Sep. 14, 2005, 15 pages, Jackson Systems, LLC, Indianapolis, IN, http://www.jacksonsystems.com/index.php?module=zone_control_products/.

Retrofit Round Damper, 2006, 7 pages, Honeywell International Inc., Golden Valley, MN 55422.

Air control dampers by Trolex Corp.self contained manual and automatic air control dampers for th . . . , Sep. 16, 2005, 13 pages, http://www.trolexcorp.com/.

Zone-A-Trol Controlling Temperature Room by Room, Condensed Catalog and List Price Index #102, Feb. 1, 2005, 4 pages, Zone-A-Trol, Elmwood Park, NJ 07407-3204.

Zone-A-Trol Controlling Temperature Room by Room, Products, Sep. 14, 2005, 2 pages, http://www.zoneatrol.com/products.html.

ZoneFirst, Automatic Opposed Blade Dampers, Models AODB, AOBM and IOBD, 2003, 2 pages, ZoneFirst, Elmwood Park, NJ 07407-3204.

ZoneFirst, Modulating Round Damper, Model RDM, 2003, 1 page, ZoneFirst, Elmwood Park, NJ 07407-3204.

ZoneFirst, Round Damper Spring Return, Model RDS, 2003, 2 pages, ZoneFirst, Elmwood Park, NJ 07407-3204.

ZoneFirst, Static Pressure Regulating Dampers, Model SPRD, 2003, 1 page, ZoneFirst, Elmwood Park, NJ 07407-3204.

ZoneFirst, Zone Dampers, Model ZD, 2003, 1 page, ZoneFirst, Elmwood Park, NJ 07407-3204.

BalancePro: Bringing Balance to forced-Air Systems, http://www.arzelzoning.com/products/balancepro, Jan. 5, 2011.

EzySlide Dampers: The Most Simple, Flexible & Reliable Dampers, Period, http://www.arzelzoning.com/products/ezyslide, Jan. 5, 2011.

Regidamper: Easy to Install Register Boot Dampers, http://www.arzelzoning.com/products/regidamper, Jan. 5, 2011.

Insertadamper: Trunk Dampering Made Simple, http://www.arzelzoning.com/products/insertadamper, Jul. 20, 2010.

\* cited by examiner

FOLDABLE, BOOT LOADABLE, INSERTABLE AIR DAMPER DEVICE

TECHNICAL FIELD

Certain embodiments of the present invention relate to air dampers. More particularly, certain embodiments of the present invention relate to air dampers that are installed into air ducts.

BACKGROUND

Today, airflow control systems are used in retrofit applications in ductwork, mainly to control a room or area's temperature and/or climate. An example of a type of control system that is utilized is a damper, which may generally be a valve or plate that stops or regulates the flow of air inside a duct, chimney, variable air volume box, air handler, or other air handling equipment. A damper can be used to shut off the airflow into various rooms or to regulate its temperature and climate. Various damper apparatuses utilize manual and/or automatic functions to adjust the airflow into the designated room or area, and thereby control its temperature qualities. However, when applying airflow control techniques to retrofit applications, reconfiguring the ductwork is very expensive because of the time and material required to modify such ductwork and the inability to access ductwork between floors or above finished ceilings, for example. Examples of dampers, when there is enough access room within the ductwork, include installation of either trunk dampers in the main trunks or branch dampers near the main truck. However, there are many instances where portions of the ductwork are inaccessible to these types of dampers, and other methods and devices are necessary. Louvered dampers, for example, may not provide a complete shutoff of the airflow.

Other considerations that may be taken into account are issues of noise level and damper size. If a damper is too large, then the damper is unusable because it is not able to fit through an opening of the ductwork. For example, if the cross section of the damper is too large, it may not be installed through a standard register boot. Additionally, damper and blade positioning are important because as the blades close, they can produce objectionable whistling due to accelerated air that moves through small spaces between the edges. Also, register dampers and register louvers tend to create rattling noises. Therefore, a need exists for a damper that can easily access existing or new ductwork and may be adjustable.

Further limitations and disadvantages of conventional, traditional, and proposed approaches will become apparent to one of skill in the art, through comparison of such systems and methods with embodiments of the present invention as set forth in the remainder of the present application with reference to the drawings.

SUMMARY OF THE INVENTION

An embodiment of the present invention comprises a boot loadable air damper device for controlling the flow of air through ductwork. The damper device is able to be folded and slipped through a register boot to control airflow. The damper device includes an actuator having a retractable member. The damper device further includes a pivoting member, wherein the pivoting member is operatively connected to the retractable member of the actuator. The damper device also includes at least one support base supporting the actuator and the pivoting member with respect to each other. The damper device further includes a foldable damper blade attached to the pivoting member, and at least one tensioned hinge member operatively connected to the foldable damper blade. The actuator may be a pneumatic (air pressure) actuator or an electro-mechanical actuator, in accordance with certain embodiments of the present invention. The electro-mechanical actuator may include a portable power supply, for example. The pivoting member may include at least two pins, for example, nylon pins. The foldable damper blade may include three portions including, for example, a first portion, a middle portion, and a second portion. The foldable damper blade may include a sealing member made of, for example, a flexible material. The tensioned hinge member may include a spring. In accordance with an embodiment of the present invention, the damper device may further include a foldable sheet member, wherein the foldable sheet member is attached to the support base. The foldable sheet member may be magnetic, for example. The damper device may also include a stop member for stopping an unfolding of the foldable damper blade.

Another embodiment of the present invention comprises a method of inserting a boot loadable air damper device into a ductwork. The method includes providing the damper device having an actuator having a retractable member, a pivoting member, wherein the pivoting member is operatively connected to the retractable member of the actuator, at least one support base supporting the actuator and the pivoting member with respect to each other, and a foldably tensioned damper blade attached to the pivoting member. The method further includes folding the foldably tensioned damper blade of the damper device, and inserting the damper device through a register boot of the ductwork. The method also includes releasing the foldably tensioned damper blade of the damper device. The method may further include securing the damper device within the ductwork. The method may also include folding a foldable sheet member of the damper device before inserting the damper device through a register boot of the ductwork, wherein the foldable sheet member is attached to the support base. The method may further include securing the damper device within the ductwork using the foldable sheet member. The method may also include operatively connecting an air hose to the actuator before inserting the damper device through the register boot of the ductwork. The method may instead include operatively connecting an external power source to the actuator before inserting the damper device through the register boot of the ductwork.

A further embodiment of the present invention comprises a register boot loadable air damper device for controlling the flow of air through ductwork. The damper device includes a foldable damper blade and a means for pivotally actuating the foldable damper blade. The damper device further includes means for folding and unfolding the damper blade. The means for pivotally actuating may be pneumatic or electro-mechanical, for example. An electro-mechanical means for pivotally actuating may include a portable power supply (e.g. a battery). The foldable damper blade may include three portions including, for example, a first portion, a middle portion, and a second portion. The foldable damper blade may include a sealing member that is made of, for example, a flexible material. In accordance with an embodiment of the present invention, the means for folding and unfolding the damper blade includes at least one tensioned hinge member. The tensioned hinge member may include a spring, for example. The damper device may further include a foldable means for securing the damper device to an interior of the ductwork. The foldable means for securing the damper device may be magnetic, in accordance with an embodiment of the present invention. The damper device may also include means for stopping an unfolding of the foldable damper blade. The damper device may further include means for supporting the foldable damper blade and the means for pivotally actuating with respect to each other.

These and other features of the claimed invention, as well as details of illustrated embodiments thereof, will be more fully understood from the following description and drawings.

DETAILED DESCRIPTION

Figure 1:
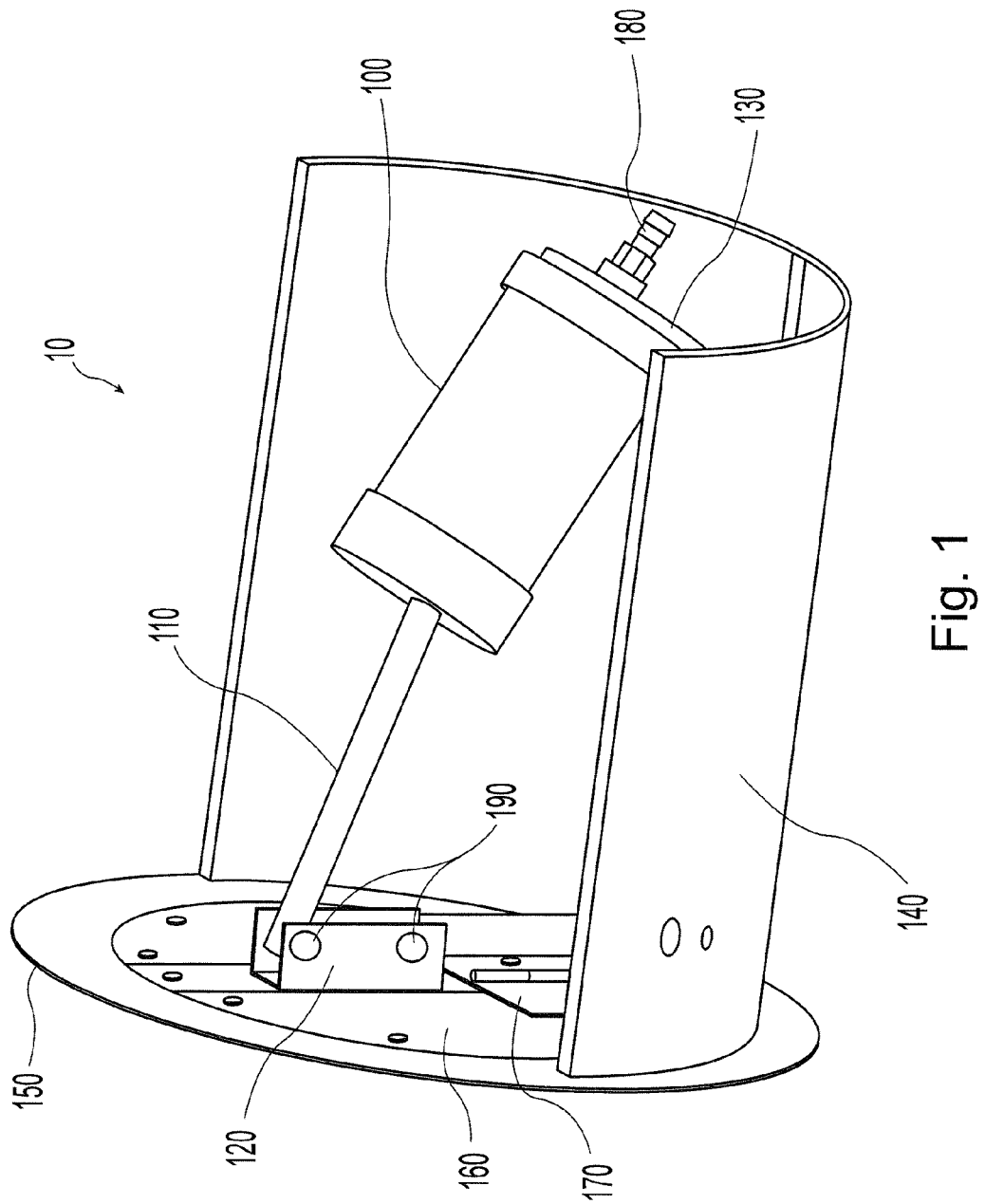
FIG. 1 illustrates a perspective view of an embodiment of an air damper device of the present invention with the damper blade unfolded and in a closed position.

FIG. 1 illustrates a perspective view of an embodiment of an air damper device 10 of the present invention with the damper blade unfolded and in a closed position. In accordance with an embodiment of the present invention, the damper device 10 is intended to be installed through a register boot of a ductwork (see FIG. 9) and is further intended to operatively interface to an electronic controller via an air pump device. The damper device 10 includes an actuator 100 having a retractable member 110, and a pivoting member 120 operatively connected to the retractable member 110 of the actuator 100. The damper device 10 also includes a support base 130 supporting the actuator 100 and the pivoting member 120 with respect to one another. The damper device 10 further includes a foldable damper blade 160 attached to the pivoting member 120, and a tensioned hinge member 170 operatively connected to the foldable damper blade 160. The foldable damper blade 160 is intended to be folded by a user's hand, by squeezing and keeping the blade 160 in a folded position in preparation for installation. When released by the user, the damper blade 160 unfolds as is described later herein.

The pivoting member 120 may be constructed of a plastic or metallic material that may be strong enough to withstand pressures or external forces that may be exerted on the damper device 10. Moreover, the pivoting member 120 may include pivoting pins 190 that allow the pivoting member 120 to be connected to the retractable member 110 and the support base 130. FIG. 1 illustrates two pivoting pins 190, however, one pivoting pin or more than two pivoting pins may be envisioned and constructed in a manner that facilitates the pivoting action of the pivoting member 120. The pivoting pins 190 may provide a smooth "self-lubricating" hinge that limits the amount of foreign material build-up. An example of such a pivoting pin may be a nylon pivoting pin, however, other materials may also be used such as plastics, metals, polymers, or any other material that may be used to create a pivoting pin that may be known to one of ordinary skill in the art.

With continued reference to FIG. 1, the support base 130 supports the actuator 100 and the pivoting member 120 with respect to one another. The support base 130 may be constructed from a single, monolithic unit, or the support base 130 may be constructed of multiple members that may add additional stability, flexibility, and/or positioning. The support base 130 may be made of a rigid material such as hard plastics, metals, or polymers. The damper device 10 may further include a foldable sheet member 140 that may be attached to the support base 130, for example. The foldable sheet member 140 may be attached to the support base 130 by staples, screws, nails, fasteners, wire, or any other method of attachment known to one of ordinary skill in the art. The foldable sheet member 140 may be foldable to allow easier access into particularly narrow ductwork. The foldable sheet member 140 may also fasten the damper device 10 to the ductwork. For example, the foldable sheet member 140 may be made of a rubber-type substance that may have high frictional properties. The high frictional properties will grip the walls of the ductwork, and in turn, "fasten" the damper device 10 to the walls of the ductwork. The foldable sheet member 140 may also be made of a magnetic material that may allow the damper device 10 to "fasten" onto the walls of the ductwork. The foldable sheet member 140 may also be made of materials known to one of ordinary skill in the art that allows the foldable sheet member 140 to secure itself onto the ductwork.

Figure 2:
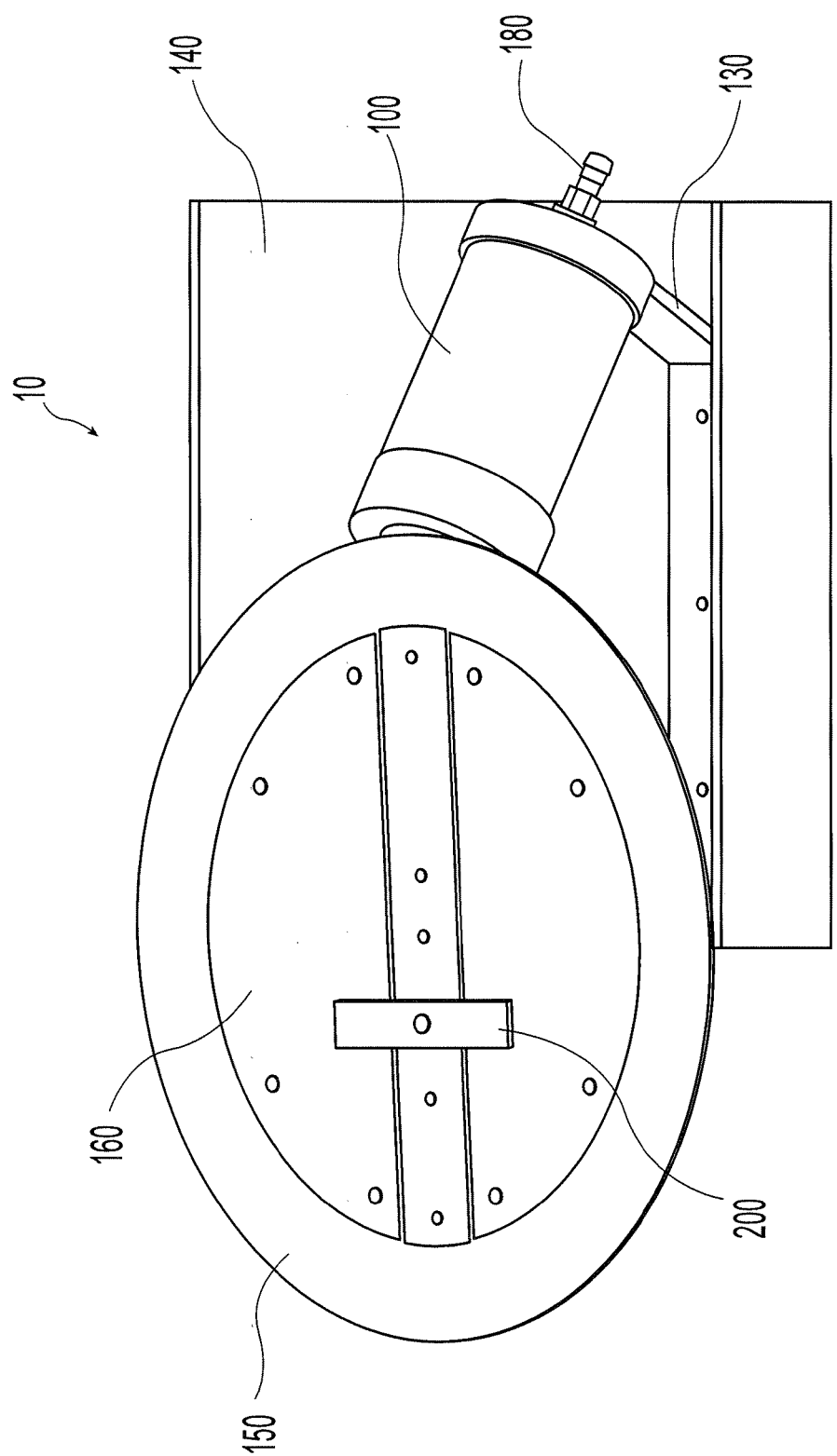
FIG. 2 illustrates a perspective view of the damper device of FIG. 1 with the damper blade unfolded and in an open position.

With reference to FIGS. 1 and 2, wherein FIG. 2 illustrates a perspective view of the damper device of FIG. 1 with the damper blade unfolded and in an open position, the foldable damper blade 160 may be in the shape of a circle or an ellipse, as shown in FIG. 1. However, the foldable damper blade 160 may also be a square, a rectangle, or an oblong shape that fits a ductwork passage and obstructs or reduces the flow of air through the ductwork. The foldable damper blade 160 may also be constructed from a single, monolithic unit or from multiple pieces. In an embodiment of the present invention, the foldable damper blade 160 may be made from a single, monolithic unit, then the foldable damper blade 160 may have lines, perforations, slits, path, or any other section that allows the foldable damper blade 160 to bend, so that the foldable damper blade 160 may fold. In another embodiment of the present invention, the foldable damper blade 160 may be made from multiple members, wherein the multiple members are attached to one another to form the foldable damper blade 160, as shown in FIG. 2. The foldable damper blade 160 may be made of a hard material such as a hard plastic, metal, polymer, or any other hard material known to one of ordinary skill in the art.

Additionally, the foldable damper blade 160 may further include a sealing member 150 (e.g., a gasket), which may be a flexible material, such as rubber, that encompasses the periphery of the foldable damper blade 160. The sealing member 150 may be in the same shape as the foldable damper blade 160, but may be larger than the foldable damper blade 160, as shown in FIG. 2. This allows the sealing member 150 to come into contact with the walls of the ductwork before the foldable damper blade 160 comes into contact. The foldable damper blade 160 may be a hard material and may cause a "rattling" noise if it were to come into contact with the ductwork since moving air causes vibrations. The sealing member 150 may be a flexible material that may not rattle against the ductwork and that may conform to the ductwork in order to form a more "air tight" seal. Moreover, the foldable damper blade 160 may be attached to the sealing member 150 by tape, glue, rivets, screws, nails, staples, or any other method of attachment known to one of ordinary skill in the art. This embodiment of the present invention may allow the foldable damper blade 160 to be placed upon and attached to the sealing member 150, which may also allow a multiple piece, foldable damper blade to retain a desired shape and retain foldable capabilities.

Figure 4:
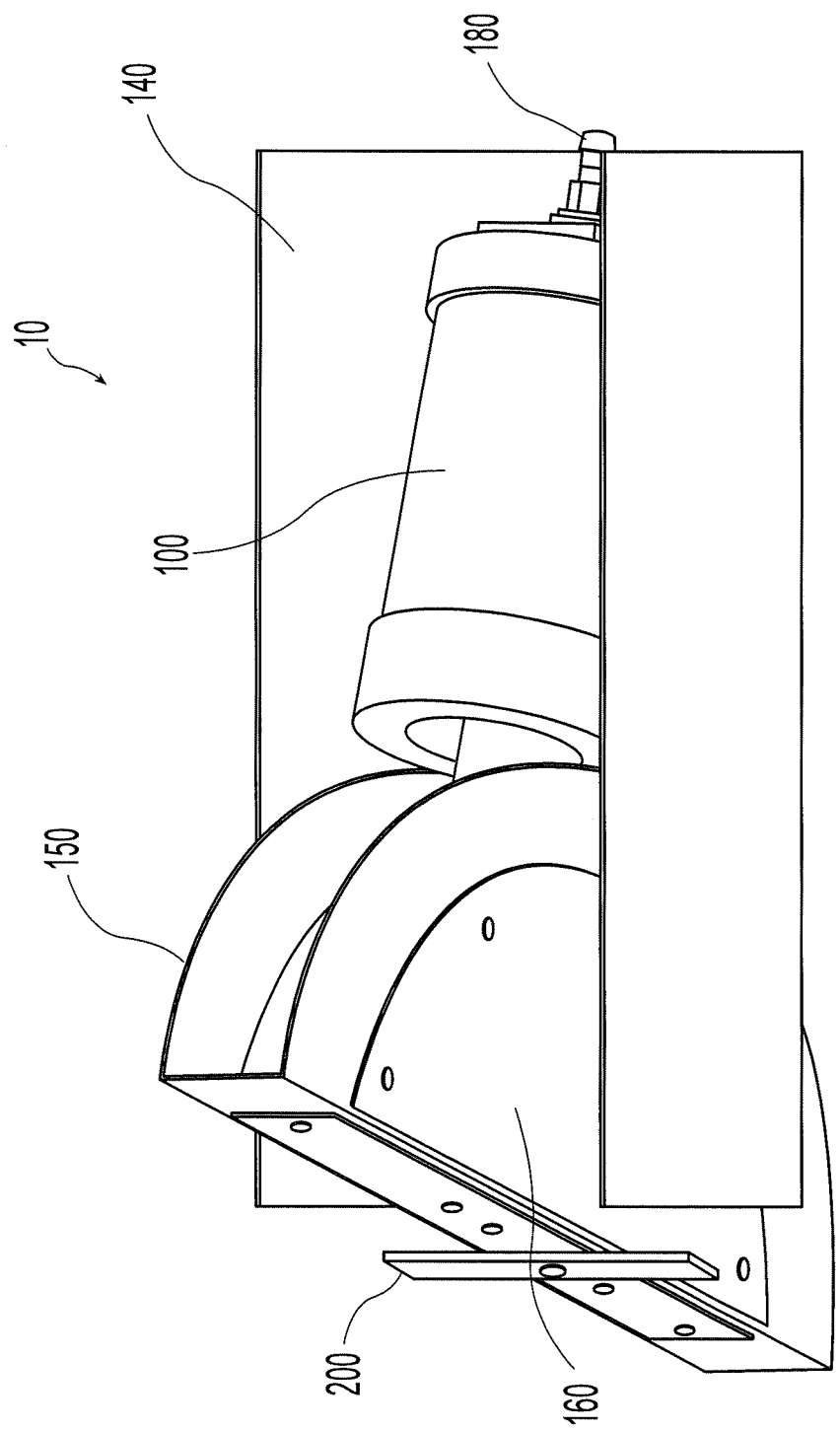
FIG. 4 illustrates a perspective view of the damper device of FIG. 1 with the damper blade completely folded.

With continued reference to FIG. 1, only one hinged tension member is shown and the tensioned hinge member 170 is shown on the side of the foldable damper blade 160 facing the actuator 100. However, various embodiments of the present invention may include more than one hinged tension members where the tensioned hinge member 170 is on the side of the foldable damper blade 160, facing away from the actuator 100. An example of an embodiment of the present invention may include two hinged tension members on either or both sides of the foldable damper blade 160. Larger, heavier foldable damper blades 160 may require larger or more tensioned hinge members 170 to efficiently "fold" and "unfold" the foldable damper blade 160. As the foldable damper blade 160 is folded or retracted, as shown in FIG. 4, the tension force created by the tensioned hinge member 170 increases, thereby creating a potential of stored energy. This potential of stored energy may be stored in a spring or any other component that may store energy known to one of ordinary skill in the art. When the foldable damper blade 160 is released, the tensioned hinge member 170 forces the foldable damper blade 160 to return to an "unfolded state," as shown in FIG. 1, for example.

With continued reference to FIG. 2, the damper device 10 may further include a stop member 200 that may be attached to the foldable damper blade 160 by a fastener such as a rivet, nail, staple, glue, tape, screw, or any other fastener known to one of ordinary skill in the art. The stop member 200 may be made of a rigid material such as a hard plastic, metal, polymer, or combination thereof. The rigid material of the stop member 200 may be strong enough to withstand the force created by the tensioned hinge member 170 so that the stop member 200 does not bend or change its shape. The stop member 200 restricts the motion or to what extent the foldable damper blade 160 may "unfold." As the tensioned hinge member 170 exerts a force on the foldable damper blade 160, the stop member 200 exerts an opposing force that restricts how far the foldable damper blade 160 may extend. Once the foldable damper blade 160 has extended to its maximum "unfolded" position, the foldable damper blade 160 may be in a position to restrict air flow in the duct work. Moreover, FIG. 2 shows the stop member 200 as being rectangular in shape, however, the shape of the stop member 200 may also be a circle, square, irregular shape, or any other shape known to one of ordinary skill in the art that may restrict the foldable damper blade's 160 movement.

Figure 5:
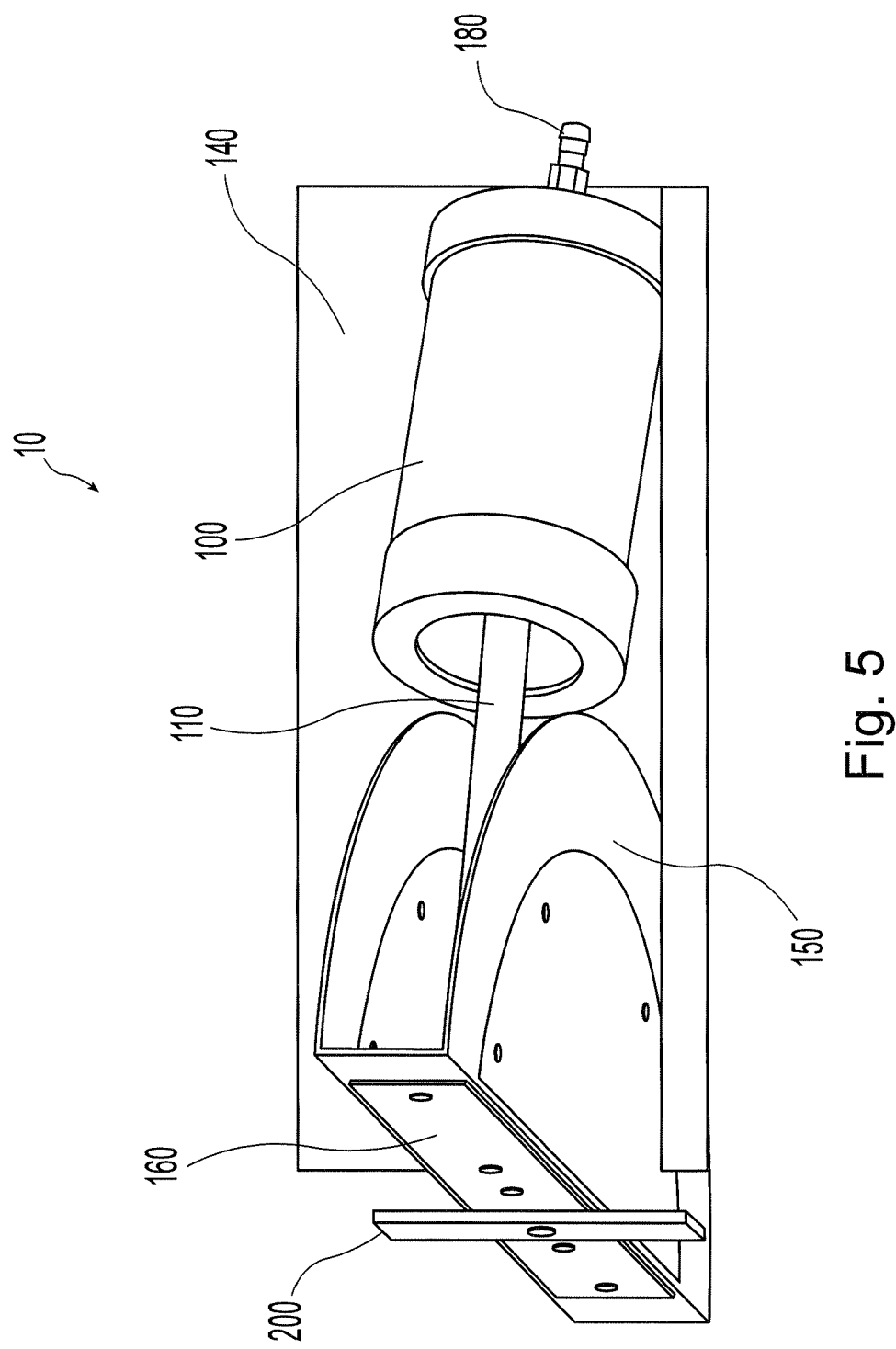
FIG. 5 illustrates a top perspective view of the damper device of FIG. 4 with the damper blade completely folded.
Figure 6:
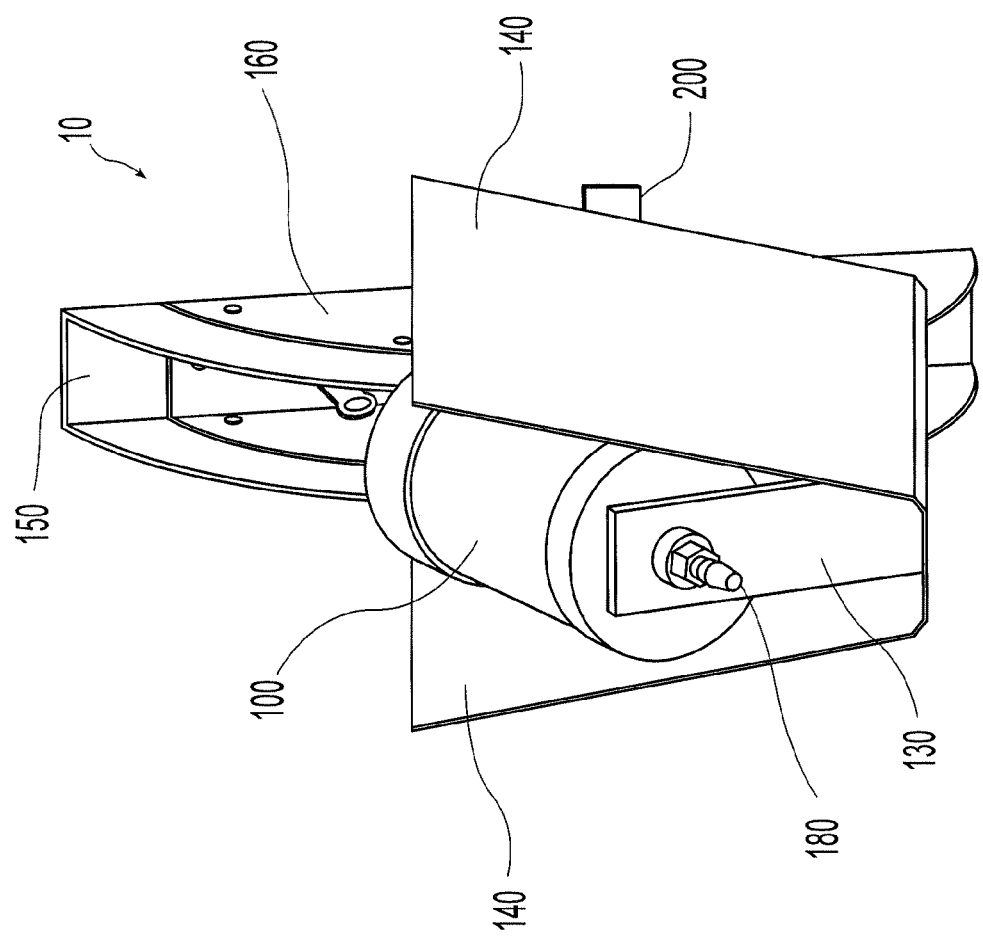
FIG. 6 illustrates a rear perspective view of the damper device of FIG. 1 with the damper blade completely folded.
Figure 7:
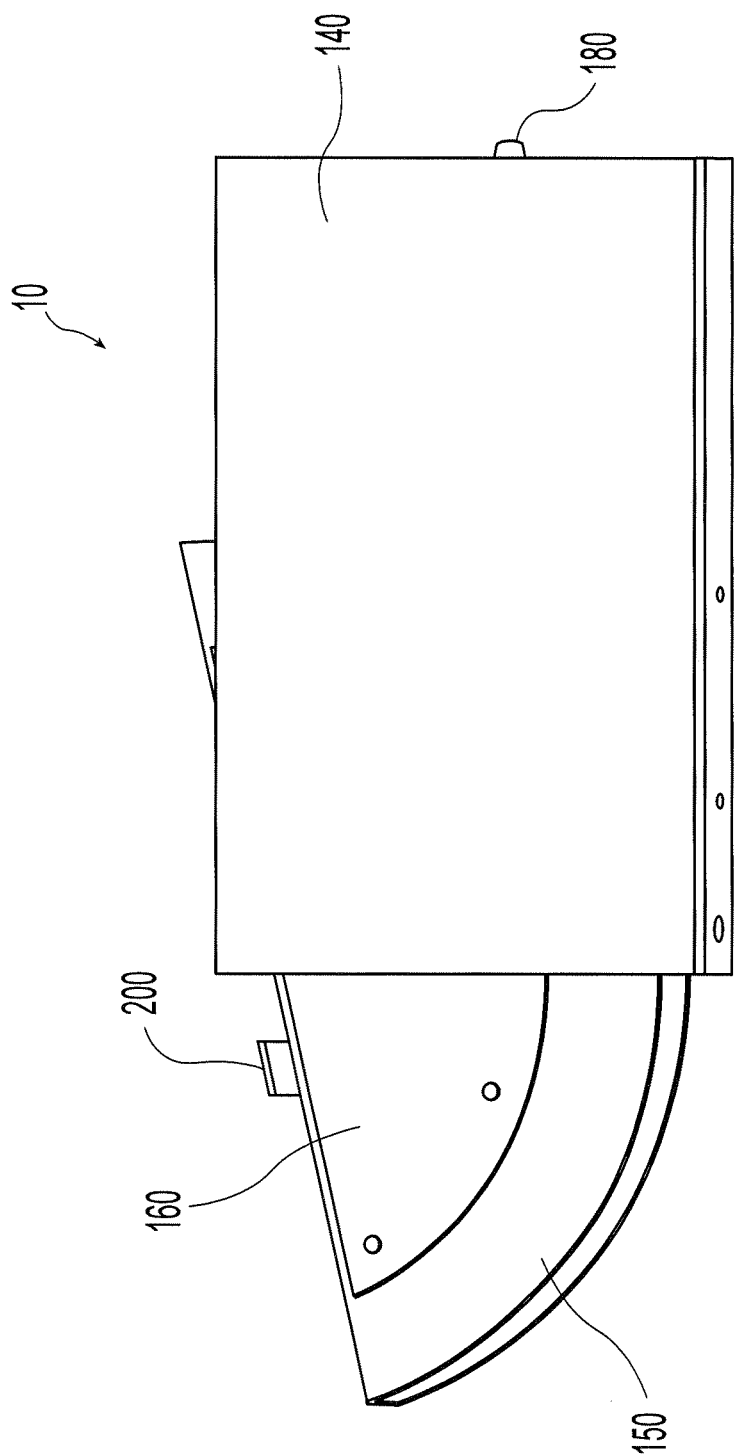
FIG. 7 illustrates a side perspective view of the damper device of FIG. 1 with the damper blade completely folded.

With reference to FIGS. 3-7, FIG. 3 illustrates a perspective view of the damper device 10 of FIG. 1 with the damper blade 160 partially folded. FIG. 4 illustrates a perspective view of the damper device 10 of FIG. 1 with the damper blade 160 completely folded. FIG. 5 illustrates a top perspective view of the damper device 10 of FIG. 4 with the damper blade 160 completely folded. FIG. 6 illustrates a rear perspective view of the damper device 10 of FIG. 1 with the damper blade 160 completely folded. FIG. 7 illustrates a side perspective view of the damper device 10 of FIG. 1 with the damper blade 160 completely folded.

Figure 8:
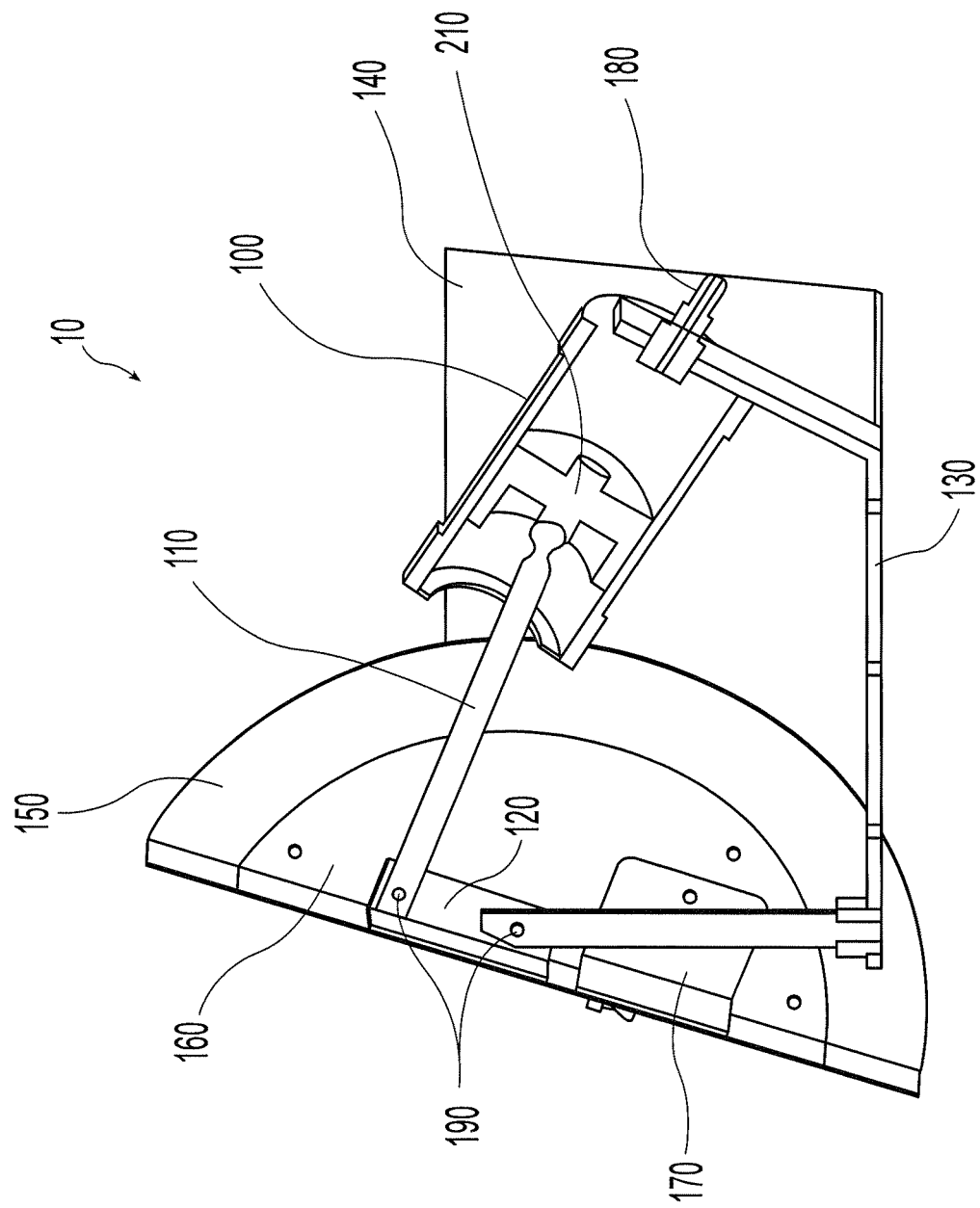
FIG. 8 illustrates a side, cross-sectional view of the damper device of FIG. 1 with the damper blade completely folded.

FIG. 8 illustrates a side, cross-sectional view of the damper device 10 of FIG. 1 with the damper blade 160 completely folded. The actuator 100 also includes an internal actuator member 210 attached to one end of the retractable member 110. As the internal actuator member 210 moves from one end of the actuator 100 to the other end, the internal actuator member 210, in turn, moves the retractable member 110 from a first position to a second position. This motion gives the retractable member 110 its ability to retract and to move back and forth. The actuator 100 may further include an adaptor 180 that may facilitate the actuator's 100 ability to actuate the internal actuator member 210. For example, in an embodiment of the present invention, the actuator 100 may be an air pressurized actuator, wherein the adapter 180 facilitates the passage of air into the actuator 100 in order to become pressurized. The supply of air may come from an air pump or air supply, not shown in the figures, which is controlled by an electronic controller, for example. In another embodiment of the present invention, the actuator 100 may be driven by electro/mechanical methods, such as a motor, wherein the adapter 180 may accept electrical lines to power the actuator 100 from, for example, an electronic controller. Additionally, in the embodiment where the actuator 100 is an electro/mechanical actuator, its power source may also include a battery or an external power supply. The actuator 100 may also be constructed from a material that is strong enough to withstand constant change in pressure or friction caused by internal parts. Some examples of such materials may include hard plastics, metals, polymers, and any other material known to one of ordinary skill in the art.

Figure 3:
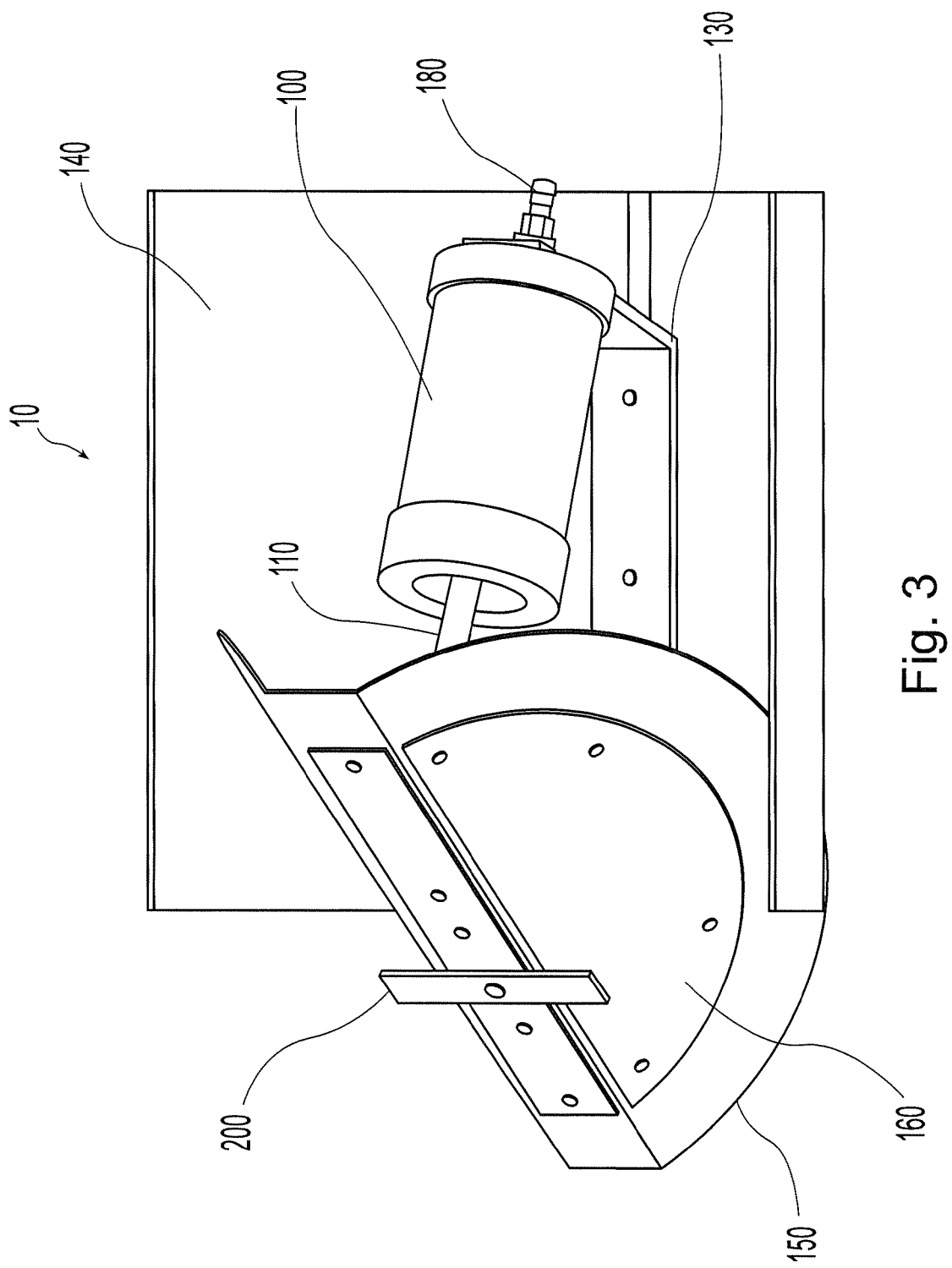
FIG. 3 illustrates a perspective view of the damper device of FIG. 1 with the damper blade partially folded.
Figure 9:
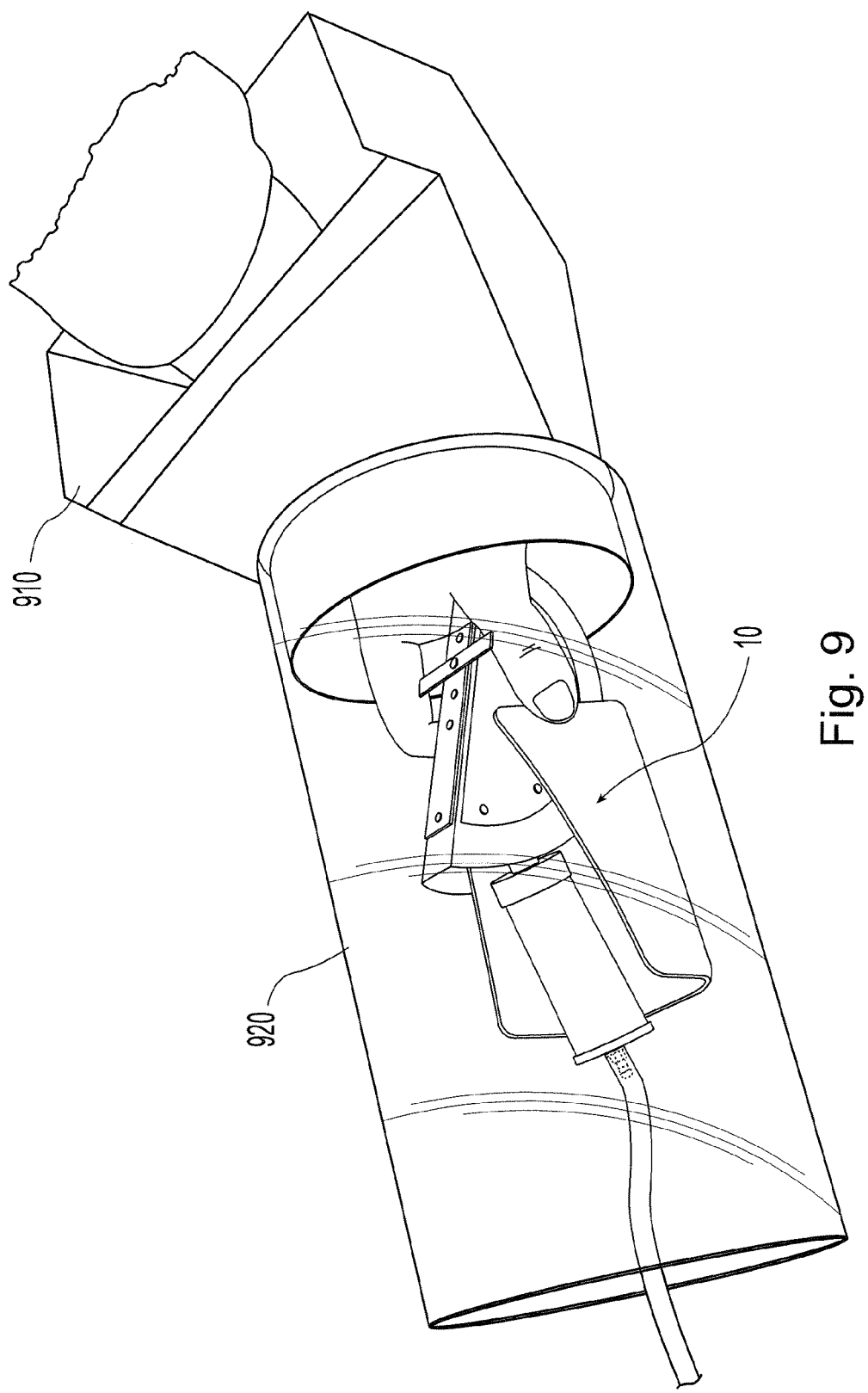
FIG. 9 illustrates the folded damper device of FIGS. 4-8 being inserted through a register boot and into a ductwork, in accordance with an embodiment of the present invention.
Figure 10:
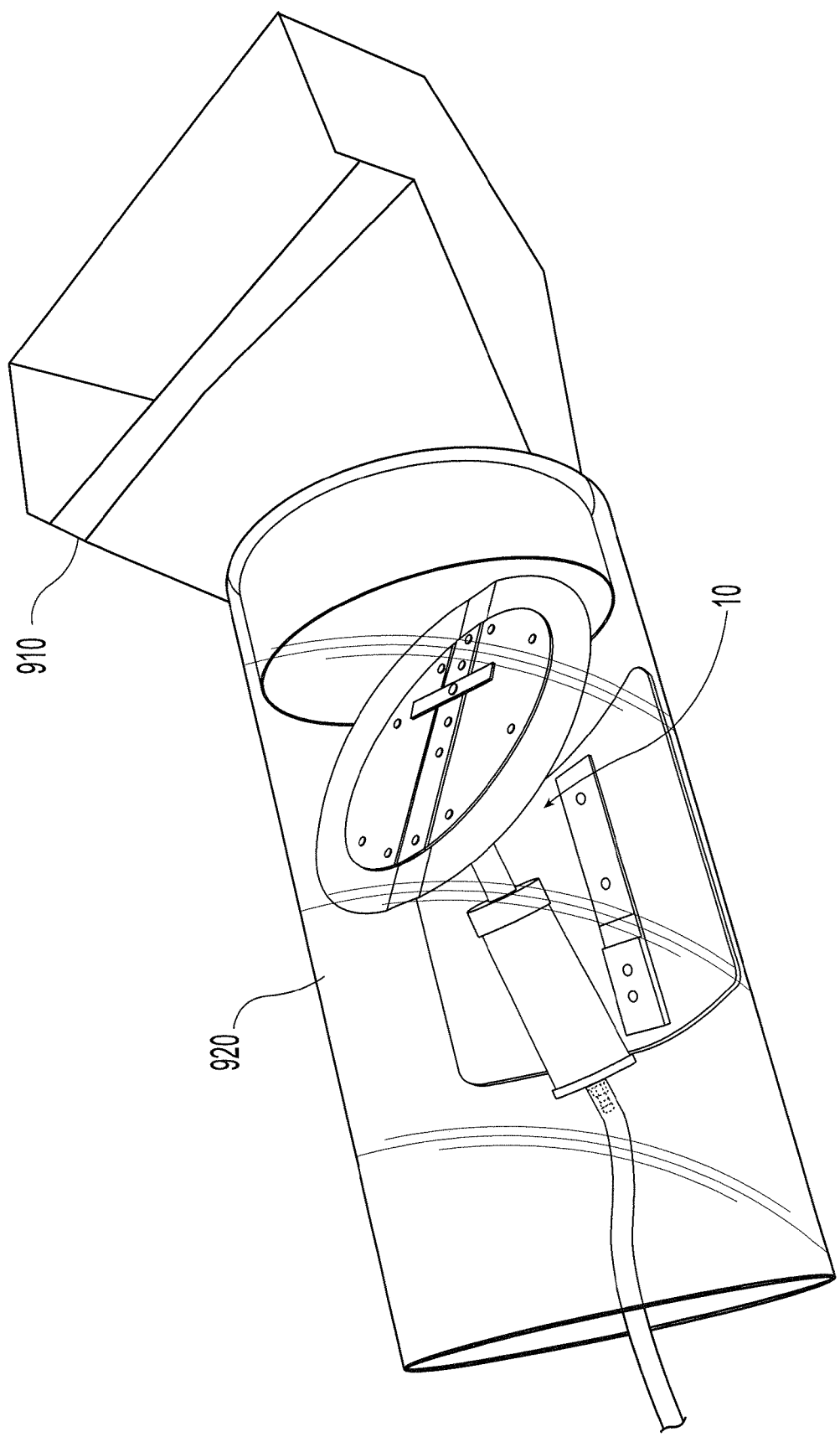
FIG. 10 illustrates the inserted damper of FIG. 9 installed and unfolded within a ductwork.

With continued reference to FIGS. 4-6, a user may "fold" the foldable damper blade 160 and the foldable sheet member 140 to compact the damper device 10. Once the user has "compacted" the damper device 10 by folding, the user may then attach an air supply or electronic controller to the damper device 10 and insert the damper device 10 into a ductwork through, for example, a register boot of the ductwork. FIG. 9 illustrates the folded damper device 10 of FIGS. 4-8 being inserted through a register boot 910 and into a ductwork 920, in accordance with an embodiment of the present invention. Once the damper device 10 is positioned to its proper position within the ductwork, the user may then "release" the damper device 10, thereby "unfolding" the foldable sheet member 140 and the foldable damper blade 160. The foldable sheet member 140 may then grip, fasten, or attach itself to the wall or walls of the ductwork 920, thereby securing the damper device 10 to the ductwork 920 as shown in FIG. 10. FIGS. 1 and 3 clearly show the sheet member 140 in a curved or semi-circular configuration as if conforming to the interior walls of a circular ductwork. In an embodiment of the present invention where a foldable sheet member is not present, the support base 130 may grip, fasten, or attach itself to the wall or walls of the ductwork, thereby securing the damper device 10 to the ductwork. Releasing the "folded" damper blade 160 causes the tensioned hinge member 170 to deploy or unfold the damper blade 160 into an "unfolded" position, as shown in FIGS. 1, 2, and 10.

Once the damper device 10 is positioned in the ductwork and the foldable damper blade 160 "unfolded," the user may then position the foldable damper blade 160 by utilizing the actuator 100. In an embodiment of the present invention wherein the actuator 100 is driven by air pressure, the user may attach an air supply hose to the adapter 180 before inserting the damper device 10 into the ductwork, in order to inject air into the actuator 100 from an air pump. Depending on the amount and/or duration of air added into the actuator 100, the foldable damper blade's 160 position, with respect to the actuator 100, may change between a first position that may allow the most amount of air flow through the ductwork, as shown in FIG. 2, and a second position that may allow the least amount of air flow through the ductwork, as shown in FIG. 1. As air is injected into (or sucked out of) the actuator 100, the internal actuator member 210 begins to move the retractable member 110, thereby pivoting the pivoting member 120 and adjusting the foldable damper blade 160.

In another embodiment of the present invention wherein the actuator 100 is powered by electricity, the user may "plug" the actuator 100 into a power source such as a battery, an electronic controller providing power, or any other power source known to one of ordinary skill in the art capable of providing the appropriate electrical power. Depending on the utilization of a power supplied actuator that may retract and extend the retractable member 110, the foldable damper blade's 160 position, with respect to the actuator 100, may change between a first position that may allow the most amount of air flow through the ductwork, as shown in FIG. 2, and a second position that may allow the least amount of air flow through the ductwork, as shown in FIG. 1. As the actuator 100 sets into motion the internal actuator member 210, the internal actuator member 210 begins to move the retractable member 110, thereby pivoting the pivoting member 120 and adjusting the foldable damper blade 160 within the ductwork.

In summary, a foldably tensioned boot loadable air damper device for controlling the flow of air through ductwork, and a method of installing same are disclosed. The damper device includes an actuator having a retractable member and a pivoting member, wherein the pivoting member is operatively connected to the retractable member of the actuator. The damper device also includes at least one support base supporting the actuator and the pivoting member with respect to each other, a foldable damper blade attached to the pivoting member, and at least one tensioned hinge member operatively connected to the foldable damper blade for unfolding the damper blade. The damper device may be loaded through a register boot and into a ductwork when folded.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

What is claimed is:

1. A boot loadable air damper device for controlling the flow of air through ductwork, the damper device comprising:
   an actuator having a retractable member;
   a pivoting member, wherein said pivoting member is operatively connected to said retractable member of said actuator;
   at least one support base supporting said actuator and said pivoting member with respect to each other;
   a foldable damper blade attached to said pivoting member, wherein said foldable damper blade has at least three spaced apart portions foldably attached to one another, including a first portion, a middle portion and a second portion, where said foldable damper blade is configured to fold along each of two substantially parallel linear paths through the damper blade, a first of the two paths disposed between the first portion and the middle portion and a second of the two paths disposed between the middle portion and the second portion; and
   at least one tensioned hinge member operatively connected to said foldable damper blade and configured to cause said foldable damper blade to be under tension when said damper blade is held in a folded state, and to cause said damper blade to unfold in response to the tension when said damper blade is released from the folded state,
   wherein said air damper device is configured to be installed through a register boot into an unmodified ductwork.

2. The boot loadable air damper device as defined in claim 1, wherein said actuator is an air pressure actuator.

3. The boot loadable air damper device as defined in claim 1, wherein said actuator is an electro-mechanical actuator.

4. The method of claim 3, wherein said electro-mechanical actuator further comprises a portable power supply.

5. The boot loadable air damper device as defined in claim 1, wherein said pivoting member further comprises at least two pins.

6. The boot loadable air damper device as defined in claim 5, wherein said at least two pins are nylon pins.

7. The boot loadable air damper device as defined in claim 1, wherein said foldable damper blade further comprises a sealing member.

8. The boot loadable air damper device as defined in claim 7, wherein said sealing member is made of a flexible material.

9. The boot loadable air damper device as defined in claim 1, wherein said at least one tensioned hinge member includes a spring.

10. The boot loadable air damper device as defined in claim 1, wherein said damper device further comprises a foldable sheet member, wherein said foldable sheet member is attached to said at least one support base.

11. The boot loadable air damper device as defined in claim 10, wherein said foldable sheet member is a magnetic foldable sheet member.

12. The boot loadable air damper device as defined in claim 1, wherein said damper device further comprises a stop member.

13. A boot loadable air damper device for controlling the flow of air through ductwork, the damper device comprising:
   a foldable damper blade having at least three spaced apart portions foldably attached to one another, including a first portion, a middle portion and a second portion, where said foldable damper blade is configured to fold along each of two substantially parallel linear paths through the damper blade, a first of the two paths disposed between the first portion and the middle portion and a second of the two paths disposed between the middle portion and the second portion;
   means for pivotally actuating said foldable damper blade; and
   means for unfolding said damper blade, wherein said damper blade is under tension by said means for unfolding when said damper blade is held in a folded state, and said damper blade unfolds in response to the tension when said damper blade is released from the folded state,
   and wherein said air damper device is configured to be installed through a register boot into an unmodified ductwork.

14. The boot loadable air damper device as defined in claim 13, wherein said means for pivotally actuating is pneumatic.

15. The boot loadable air damper device as defined in claim 13, wherein said means for pivotally actuating is electro-mechanical.

16. The boot loadable air damper device as defined in claim 15, wherein said electro-mechanical means for pivotally actuating includes a portable power supply.

17. The boot loadable air damper device as defined in claim 13, wherein said foldable damper blade further comprises a sealing member.

18. The boot loadable air damper device as defined in claim 17, wherein said sealing member is made of a flexible material.

19. The boot loadable air damper device as defined in claim 13, wherein said means for unfolding said damper blade includes at least one tensioned hinge member.

20. The boot loadable air damper device as defined in claim 19, wherein said at least one tensioned hinge member further comprises a spring.

21. The boot loadable air damper device as defined in claim 13, wherein said damper device further comprises a foldable means for securing said damper device to an interior of said ductwork.

22. The boot loadable air damper device as defined in claim 21, wherein said foldable means for securing is magnetic.

23. The boot loadable air damper device as defined in claim 13, wherein said damper device further comprises a means for stopping an unfolding of said foldable damper blade.

24. The boot loadable air damper device as defined in claim 13 further comprising means for supporting said foldable damper blade and said means for pivotally actuating with respect to each other.

* * * * *